Patented Dec. 18, 1928.

1,695,566

UNITED STATES PATENT OFFICE.

VICTOR H. TURKINGTON, OF CALDWELL, NEW JERSEY, ASSIGNOR TO BAKELITE CORPORATION, OF NEW YORK, N. Y., A CORPORATION OF DELAWARE.

PHENOLIC RESIN COMPOSITION.

No Drawing.      Application filed May 24, 1926. Serial No. 111,373.

This invention comprises a resin varnish composition possessing improved flexibility as compared with compositions now available, and also other valuable properties and characteristics as will appear hereinafter. According to my invention in its preferred embodiment, I incorporate with phenolic resins, or solutions thereof, a di-alkyl phthalate, preferably di-butyl phthalate.
Di-butyl phthalate is a colorless liquid boiling at about 340° C. and possessing substantially zero vapor pressure throughout the ordinary summer temperature range. I have found, for example, that it is an excellent solvent for the reactive phenol-methylene resins, especially when employed as an auxiliary solvent in conjunction with alcohol or acetone. Varnishes thus prepared yield excellent films, and the di-butyl phthalate sufficiently retards the hardening reaction so as to permit the complete expulsion of alcohol or other lower boiling solvent, and also of any water which may be present. These phthalate compounds are water-repellent to an exceptional degree, whereby the elimination of water from the varnish film is greatly facilitated. Moreover they do not form constant-boiling mixtures with alcohol, so that all of the alcohol is readily expelled from the film, which is characterized by excellent dielectric properties, as well as by the water-repellent character above mentioned. The film is also flexible, to a degree depending upon the amount of the phthalate addition, and possesses the great advantage as compared with varnish films plasticized with most other additions that it does not lose its flexibility, at least to any material extent, with lapse of time under ordinary conditions of use.

The proportion of di-alkyl-phthalate relative to the resin may be widely varied according to the specific application for which it is intended. As a rule 20–40 parts by weight of di-butyl phthalate per 100 parts of resin will be found suitable; but higher or lower proportions may be used. Where a very highly flexible film is desired, proportions up to equal parts of resin and phthalate may be used.

The varnish may be used directly as a coating for wood, metal or other base, but its preferred applications, at present, are for the preparation of molding mixtures; the coating of paper, cloth, leather and other flexible fibrous sheets; and the manufacture of laminated sheets and articles. For all of these applications the varnish is used substantially as are the known varnishes of the phenol-methylene or phenol-aldehyde type. When single sheets of paper or cloth are to be coated or impregnated this is effected by dipping, spraying or other method, the sheet dried at moderate temperature to expel water and lighter solvents, and finally subjected to higher temperature, say 130°–160° C., for a sufficient time to transform the reactive resin to the final insoluble and infusible or resinoid modification. In the case of molding mixtures and laminated stock, these are of course consolidated by heavy pressure in heated presses, in the manner now well understood in this art.

The products thus made are characterized by a relatively high shock-resistance combined with a satisfactory tensile strength. They are more or less yielding or flexible according to the nature of the fibrous base and the proportion of incorporated phthalate, and are well adapted for a wide variety of uses, among which I may mention laminated punching stock, gaskets, gear-stock, etc. Canvas gears bonded by this resin composition combine high strength and shock resistance with a slight flexibility which enhances their "noiseless" quality.

Fabrics coated with the hereindescribed resin compositions are applicable for use in many arts; for example as window-shades, automobile tops, tire-covers, tents, sail-cloth, artificial leather, etc., etc. On account of its excellent insulating quality combined with flexibility, the coated or impregnated sheets, whether of paper or fabric, are useful for cable-insulation and analogous purposes. The composition is also well adapted for bonding cork in the manufacture of linoleum, floor tiles and miscellaneous cork compositions, as well as for a multitude of other uses which need not be here specifically mentioned.

The present invention is not of course restricted to any particular composition of phenolic resin, but is broadly applicable to such phenolic resins as require to be plasticized, irrespective of the particular methylene body or aldehyde used in their preparation.

Instead of di-butyl phthalate I may use its homologs, such for example as di-ethyl phthalate, or the corresponding di-propyl or di-amyl compounds; or instead of the phthalates I may use the corresponding compounds of other di-basic organic acids such as the tartrates, oxalates, etc. For example I have thus employed di-ethyl tartrate (B. P. 280° C.); di-butyl tartrate (B. P. 300° C.); and di-butyl oxalate (B. P. 244° C.); but as above stated the di-alkyl phthalates are used in the preferred embodiment of the invention.

Instead of the phenol-methylene resins I may substitute other synthetic resins, such as the known urea-formaldehyde resins; the glycerol-phthalic anhydride resins, or others; or for certain uses I may even employ natural resins: but for the fullest realization of the advantages of my invention I employ the resins of the reactive phenol-mythylene type, as already explained.

I claim:

1. The hereindescribed varnish composition comprising a synthetic resin of the heat-hardening type, a volatile solvent therefor, and a di-alkyl ester of an organic acid.

2. The hereindescribed varnish composition comprising a reactive phenol-mythylene resin, a volatile solvent therefor, and a di-alkyl ester of an organic acid.

3. The hereindescribed varnish composition comprising a synthetic resin of the heat-hardening type, a volatile solvent therefor, and di-butyl phthalate.

4. The hereindescribed varnish composition comprising a reactive phenol-mythylene resin, a volatile solvent therefor, and di-butyl phthalate.

In testimony whereof, I affix my signature.

VICTOR H. TURKINGTON.